United States Patent Office … 3,398,176 … Patented Aug. 20, 1968

3,398,176
STABILIZED LINEAR SILOXANE POLYMERS
Siegfried Nitzsche, Manfred Wick, and Karl-Heinrich W. Wegehaupt, Burghausen, Upper Bavaria, Germany, assignors to Wacker-Chemie G.m.b.H., Munich, Germany
No Drawing. Filed Apr. 28, 1965, Ser. No. 452,046
Claims priority, application Germany, May 6, 1964, W 36,735
9 Claims. (Cl. 260—448.2)

ABSTRACT OF THE DISCLOSURE

Essentially diorganosiloxane polymers are prepared by polymerizing hydroxyl endblocked low molecular weight diorganosiloxanes employing phosphoronitrile chlorides as catalytic agents and thereafter the catalyst is neutralized by adding 1 to 1½ mols of a tertiary amine per mol of phosphoronitrile chloride catalyst present.

---

This invention relates to a method for preparing essentially linear siloxane polymers exhibiting little or no change in viscosity with time.

Fluid siloxane polymers are well known. Such polymers are essentially linear and are based upon units of the formula $R_2SiO$—where each R is a monovalent hydrocarbon, halogenohydrocarbon, cyanohydrocarbon, aminohydrocarbon, or other substituted hydrocarbon radical or hydrogen atoms. Such polymers may contain $RSiO_{3/2}$ and $R_3SiO_{1/2}$ units in equal amounts without loss of linearity.

Among the most useful of the linear siloxane polymers are those polymers exhibiting hydroxyl groups on the terminal silicon atoms. Such polymers are designated alpha, omega-hydroxyl diorganosiloxanes and can be generally defined by the formula

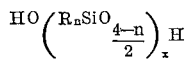

where $n$ has an average value of 1.98–2.0 and $x$ is an integer usually greater than 20. The silicone rubber products well known and widely used in commerce employ large quantities of these hydroxyl endblocked siloxane polymers. The polymers useful in silicone rubber stocks must have a reasonably long chain length hence, referring to the general formula, such polymers can be described as those where $x$ has a value of at least 250.

The siloxane polymers of desired molecular weight are prepared from low molecular weight linear diorganosiloxane polymers having a hydroxyl group on each terminal silicon employing a condensation catalyst such as phosphoronitrilechlorides or employing a strong alkali compound. Alternatively, the desired polymers can be obtained from cyclic diorganosiloxane polymers such as $(R_2SiO)_3$ and $(R_2SiO)_4$ employing rearrangement catalysts. In either case, the catalyst employed remains in the product and is difficult to deactivate or remove. The presence of the catalyst may result in the polymerization reaction "coasting" and the polymer viscosity continues to increase beyond the desired level. On the other hand, the polymer may be rearranged to form essentially stable, unreactive cyclic polymers which result in a lowering of the viscosity of the fluid. Thus the siloxane polymers with catalysts remaining active therein do not exhibit the desired stability of viscosity during storage.

The removal of the catalysts from the siloxane polymers has been attempted. The catalysts can be removed by repeated washing of the polymeric product with water. However, the high polymeric materials are difficult to handle during a washing procedure and it is almost impossible to insure that the water reaches and removes the last traces of catalyst in the mass.

The catalysts in the linear, high molecular weight siloxane polymers have also been deactivated by addition of other materials which react with and neutralize the catalysts. However, it is apparent such a technique merely adds further amounts of contaminants and foreign materials to the siloxane polymer mass and removal of the neutralized catalyst plus neutralizing additive will be at least as difficult as was the removal of the unneutralized catalyst alone. A further method of neutralizing the catalyst involves heating the mass to deactivate the catalyst by heat but when the catalyst decomposes it will generally produce decomposition products which require removal before the siloxane polymer is employed in a rubber stock.

Accordingly, an acceptable and simple method for neutralizing the polymerization catalyst in an essentially linear diorganosiloxane polymer is the primary object of this invention. A diorganosiloxane polymer exhibiting hydroxyl radicals on the terminal silicon atoms and having a stable viscosity suitable for use in elastomeric products is also an object of this invention. Other objects and advantages of this invention are detailed in or will be apparent from the disclosure and claims following.

The method of the present invention comprises polymerizing diorganosilicon monomers and polymers exhibiting hydroxyl groups bonded to silicon atoms employing phosphoronitrile chlorides as condensation catalysts and neutralizing said condensation catalyst by reaction with a tertiaryamine when the desired degree of polymerization has been achieved. It is preferred to employ 1 to 1.5 mols of the tertiary amine per mol of phosphoronitrile chloride in the mass.

The polymerization reaction employed herein has been recognized and detailed in U.S. Patents No. 2,830,967 and No. 2,990,419, both of which are assigned to the assignee of this application.

The polymers produced herein are condensation products obtained from diorganosilicon monomers or polymers of the general average formula

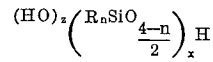

where each R is a monovalent hydrocarbon or substituted hydrocarbon radical, $z$ has an average value of 0.95 to 1.05, $n$ has an average value of 1.95 to 2.05, the sum of $n+z=3.00$ and $x$ is at least 1. As can be seen from the average value of $n$, the starting organosilicon material can have a small amount (i.e. less than 5 mol percent) of $R_3SiO_{1/2}$, $RSiO_{3/2}$, and/or $SiO_{4/2}$ units but the closer the polymer approaches the ideal diorganosiloxane wherein $n=2.00$, the better the results. The units other than diorganosiloxane units are, however, frequently present in trace amounts due to production methods. It is also to be noted that the polymers operative herein can contain silcarbane linkages. Thus up to 50 percent of the silicon atoms can be bonded through $\equiv SiCH_2Si\equiv$ linkage

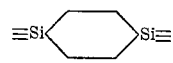

linkage or through other recognized divalent hydrocarbon and substituted hydrocarbon radicals.

The radicals defined by R in the general formula include monovalent hydrocarbon and substituted hydrocarbon radicals. Illustrative of such radicals are: alkyl radicals such as methyl, ethyl, propyl, butyl, dodecyl, octadecyl, myricyl and radicals of the type $C_aH_{2a+1}$, where $a$ is an integer; alkenyl radicals of the type $C_aH_{2a}$ and/or $C_aH_{2a-1}$ such as vinyl, allyl, hexenyl, octadecenyl, $$—CH=CH(CH_2)_aCH=CH—$$

$—CH_2CH=CH(CH_2)_aCH=CHCH_2—$, etc.; cycloalkyl radicals of the type

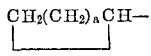

such as cyclobutyl, cyclopentyl, cyclohexyl, cyclononyl and cyclooctadecyl; cycloalkenyl radicals of the type

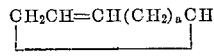

such as cyclopentenyl, cyclohexenyl and cyclooctadecenyl radicals; aryl radicals such as phenyl, xenyl, naphthyl and phenanthryl radicals; aralkyl radicals such as benzyl, betaphenylethyl and xylyl radicals; alkaryl radicals such as tolyl, ethylphenyl, methylnaphthyl and nonylphenyl; halogenated derivatives of the foregoing such as chloromethyl, trifluorovinyl, o-, p-, and m-chlorophenyl, 3,3,3-trifluoropropyl, perfluoroalkylethyl of the type $$C_aF_{2a+1}CH_2CH_2—$$

o-, p-, and m-bromophenyl, $\alpha,\alpha,\alpha$-trifluorotolyl, pentafluorobutyl, bromoxenyl, chlorotrifluorocyclobutyl, chlorocyclohexyl, chlorocyclohexenyl, iodophenyl and perfluoroalkyl radicals; cyano-alkyl radicals such as $\beta$-cyanoethyl, gamma-cyanopropyl, $\omega$-cyanobutyl, $\beta$-cyano-n-propyl, gamma-cyano-n-butyl, and cyanooctadecyl. If some of the R radicals are cyanoalkyl radicals, they are preferably present on at least 1 mol percent of the silicon atoms present.

Preferably, the R radicals contain less than 20 carbon atoms. Further, it is preferred that the R radicals bonded to silicon atoms having —OH groups bonded thereto should not have a tertiary carbon atom in the $\alpha$ position to the silicon atom. In general, at least 50 percent of the radicals represented by R should be saturated aliphatic hydrocarbon radicals and most preferred are the methyl radicals. Excellent results are achieved with polymers wherein 50–100 percent of the R radicals are methyl radicals and up to 50 percent are ethyl, propyl, vinyl, phenyl, or 3,3,3-trifluoropropyl radicals. It should be clearly understood the radicals R are such that homopolymers and copolymers are included herein. The most preferred starting materials are (a) $\alpha,\omega$-dihydroxydiorganosiloxane polymers, (b) mixtures of (a) and up to 15 mol percent $(C_6H_5)_2Si(OH)_2$, $HO[(C_6H_5)_2SiO]_xH$, $$C_6H_5(CH_3)Si(OH)_2$$

or $HO[(C_6H_5)(CH_3)SiO]_xH$, and (c) mixtures of the polymers (a) and (b) above and 0.1 to 0.5 mol percent $CH_3(CH_2=CH)Si(OH)_2$, $HO[CH_3(CH_2=CH)SiO]_xH$ or $$CH_2=CH(CH_3)(HO)SiO[R_2SiO]_x$$
$$SiCH_3(CH=CH_2)(OH)$$

As noted above, up to 50 percent of the $\equiv SiOSi\equiv$ linkages indicated in the average general formula can be replaced by silcarbane linkage whereby silicon atoms are linked through divalent organic radicals. The silcarbane linkage can be any divalent hydrocarbon radical or it can be a divalent radical of carbon and hydrogen atoms with some oxygen atoms present as ether linkages and/or with some halogen substituents. Examples of such linkages are alkylene radicals of the type —$C_aH_{2a}$— such as $$—CH_2—$$

—$C_2H_4$—, —$CH_2CH(CH_3)$—, —$CH_2(CH_2)_6CH_2$—

$$—CH_2CH(CH_3)CH_2—$$

—$CH_2C(CH_3)_2CH_2$—, —$CH_2OCH_2$—, —$C_2H_4OC_2H_4$—, and —$CH_2OCH_2CH_2CH_2$—, arylene radicals such as $$—C_6H_4—$$

—$C_6H_4OC_6H_4$—, $C_6H_4CH_2C_6H_4$— and —$C_{10}H_8$—, aralkylene radicals such as —$CH_2C_6H_4CH_2$—, halogenated derivatives of the foregoing such as $$—CH_2CH(CF_3)CH_2—$$

—$C_6Cl_4$—, —$C_6H_4CF_2C_6H_4$—, and —$CH_2C_6F_4CH_2$—.
In the foregoing divalent radicals, the arylene nucleus can be bonded to Si or to other substituents in the ortho-, meta-, or para-position. It is preferred that the divalent substituents contain less than 20 carbon atoms. Further, these divalent radicals can be bonded to a silicon atom carrying an —OH radical and in this situation it is preferred that the divalent radical is free of branching on the carbon in the alpha position to the silicon.

The phosphoronitrilechlorides also foster the rearrangement of siloxane compounds in the presence of Si-bonded hydroxyl groups hence cyclic diorganopolysiloxanes and/or triorganosiloxy group-endblocked linear diorganopolysiloxanes can also be used in addition to the linear, Si-bonded hydroxyl group-containing diorganosiloxanes or silanols. All the above examples of organic radicals in the linear Si-bonded hydroxyl group-containing diorganosiloxanes or silanols are also applicable for the cyclic- and triorganosilyl endblocked diorganopolysiloxanes. Up to 5% of their weight of the diorganosiloxane units in the cyclic diorganopolysiloxanes can be replaced by triorgano-, monoorgano- and/or $SiO_{4/2}$ units; the linear diorganopolysiloxanes endblocked by triorganosiloxy groups can contain up to 5% of their weight of monoorgano- and/or $SiO_{4/2}$ units in addition (aside from) diorganosiloxy and triorganosiloxy units.

The viscosity of the diorganopolysiloxanes which are incorporated is not critical and the viscosity can be lower than every viscosity desired for the final end product. It is preferably under 100,000 cs./25° C., especially 50,000 cs./25° C., most often in the range of 25 to 1000 cs./25° C.

The phosphoronitrilechlorides which are preferred are the polymeric products obtainable from the reaction of phosphoropentachloride with ammonium chloride according to "Berichte der Deutschen Chemischen Gesellschaft" (1924), pp. 1345–1346 or "Journal of the Chemical Society" (1960), pp. 2542 to 2547. They correspond to the formula $(PNCl_2)_m$, where $m$ has a value of at least 1 and $m$ is preferably in the range 3–6 inclusive.

The phosphoronitrilechlorides are expediently used in weight quantities of 0.001 to 0.1%, preferably 0.005 to 0.02%, always calculated on the weight of the silicon compounds incorporated. Smaller or larger quantities can also be used, if desired, however.

To improve the distribution and for simpler means of dosage the phosphoronitrilechlorides are preferably used in the form of their solutions in an inert organic solvent, i.e., a solvent which will not react with the phosphoronitrilechlorides, the silicon compounds used in the process of the present discovery, and the tertiary amines at room temperature. Expediently these solutions contain 20–60 percent by weight of phosphoronitrilechlorides, calculated on the total weight of solution and phosphoronitrilechlorides. Examples of suitable solvents are hydrocarbons such as benzene, toluene, xylene or petroleum ether; halohydrocarbons, such as methylenechloride, perchloroethylene or chlorobenzene; ethers, such as diethylether and di-n-butylether as well as ketones, such as methylisobutylketone.

The known condensation of the hydroxyl endblocked diorganosiloxane and/or silanols with the help of phosphoronitrilechlorides preferably takes place at 15° to 30° C., i.e. at or nearly at room temperature. If desired, the reaction can be carried out at lower or higher temperatures. The pressure applied is usually normal pressure. If desired, higher or lower pressures can be used. The temperatures and pressures given also serve for the reaction of the phosphoronitrilechlorides with the tertiary amines.

The duration of the condensation depends on the type of diorganopolysiloxanes to be condensed as well as on the quantity of phosphoronitrilechlorides and the temperature. Increasing viscosity can be observed, for instance, quantitatively by means of a Brookfield viscosimeter. After the desired viscosity is obtained, which is preferably in a range of 5,000 to 100,000 cs./25° C., the mixture of diorganopolysiloxanes and phosphoronitrilechlorides is combined according to the present discovery with 1 to 1.5 mol of tertiary amines per mole of phosphoronitrilechlorides incorporated.

The preferred tertiary amines are those with an equivalent weight under 300, especially those of the general formula $R'_3N$, wherein $R'$ is a monovalent hydrocarbon radical, substituted by a hydroxyl group if desired, and/or interrupted by one or more oxygen atoms. Examples of R hydrocarbon radicals given above also apply to the $R'$ hydrocarbon radicals. The $R'$ hydrocarbon radicals which are substituted by a hydroxyl group and/or by one of more ethereal oxygen atoms are preferably hydroxyalkyl radicals, such as the beta-hydroxyethyl- and gamma-hydroxypropyl radical or hydroxyalkyloxyalkyl radicals, viz., of the formula $HOCH_2CH_2OCH_2CH_2-$, $HOCH_2CH_2OCH_2CH_2CH_2-$ and $$HO(CH_2CH_2O)_2-CH_2H_2-$$

Examples of the amines preferred for the present discovery are diethylbenzylamine, diethylisoamylamine, tri-n-butylamine, triisobutylamine, tri-sec.-butylamine, dimethyllaurylamine, dimethyl-ethylamine, tri-n-propylamine, triisopropylamine, triethylamine, methyldiethylamine, triphenylamine, triisoamylamine and triethanolamine. Mixtures of various tertiary amines can be used.

Preferably about 1 to 1.1 mol amines per mol phosphoronitrilechloride are used. To improve distribution and to provide a simpler means of dosage the tertiary amines can be used in the form of their solutions in an inert organic solvent, i.e., a solvent which will not react with tertiary amines and the silicon compounds used for the present discovery at room temperature such as those mentioned in connection with the phosphoronitrilechlorides. Expediently these solutions contain 20–60% by weight of tertiary amine, calculated on the total weight of solution and amine.

The term "mol" in connection with the phosphoronitrilechlorides does not relate to the total molecule, but to the $PNCl_2$ unit. According to the method of the present discovery a reaction could take place according to the following equation:

$$(PNCl_2)_m + mR'_3N \rightarrow (PNCl_2 \cdot R'_3N)_m$$

In condensing and in reacting the phosphoronitrilechlorides with tertiary amine, the reaction mixture is preferably stirred, shaken or otherwise agitated in order to insure good distribution of the materials used in the process of the present discovery.

Preferably the addition of the tertiary amines precedes the addition of other materials such as fillers.

The process of preparing diorganopolysiloxanes with constant viscosity according to the present discovery possesses, contrary to the above-described unfavorable processes, the primary advantage that it is practicable as well as very easy at room temperature and that it makes possible the establishment of any desired constant viscosity. The product resulting from the reaction of the phosphoronitrilechlorides with tertiary amine also increases the heat stability of the diorganopolysiloxanes and need not be removed from the diorganopolysiloxanes. Primary and secondary amines do not have the advantages described.

The process of the present discovery is especially suitable for preparing linear diorganopolysiloxanes having a hydroxyl group in the terminal units, with a viscosity of 5,000 to 100,000 cs./25° C., as they are used for preparing elastomers curable at room temperature and based on diorganopolysiloxanes. But the process of the present discovery can also be employed, for example, for the preparation of triorganosiloxy group, viz., trimethylsiloxy- or vinyldimethylsiloxy group endblocked diorganopolysiloxanes, viz., dimethylpolysiloxanes, from the diorganopolysiloxanes displaying a hydroxyl group in the terminal units and triorganosiloxy group-endblocked diorganopolysiloxanes by means of phosphoronitrilechlorides.

The steps described in the following examples as well as the viscosity measurements were carried out at 25° C. and normal pressure. The phosphoronitrilechloride which was used in the examples was prepared according to Berichte der Deutschen Chemischen Gesellschaft, vol. 57, 1024, p. 1345, by heating 400 g. phosphoropentachloride with 130 g. ammonium chloride in 1 liter tetrachloroethane to 135° C. until gas development terminated and distilling off the solvent. The residue remaining after the distillation of the solvent was dissolved in methylene chloride without further processing and then used.

The following examples are included herein to aid those skilled in the art to gain an understanding of this invention. These examples do not limit the scope of the invention which is delineated in the claims. All viscosities were measured at 25° C.

Example 1

1000 g. of a linear dimethylpolysiloxane containing a hydroxyl group in the terminal units and having a viscosity of 400 cs./25° C., was mixed with 0.2 ml. of a 30% by weight solution of phosphoronitrilechloride in methylenechloride while stirring. After 3 to 5 minutes an increase in viscosity was noted. The viscosity increase was measured with a Brookfield viscosimeter. Within 30 minutes the viscosity had risen to 25,000 cs. At this viscosity 0.45 ml. of a 30% by weight solution of dimethyllaurylamine was stirred into the mixture. The viscosity continued to rise to 25,700 cs./25° C. further change in viscosity could not be observed after one-half year of storage.

Example 2

1000 g. of a linear, phenylmethylpolysiloxane containing a hydroxyl group in each terminal unit having a viscosity of 750 cs./25° C. was mixed with 0.5 ml. of a 30% by weight solution of phosphoronitrilechloride in methylenechloride while stirring. The rise in viscosity was measured with a Brookfield viscosimeter. After 2.5 hours the viscosity had risen to 15,000 cs. At this viscosity 0.56 ml. of a 50% by weight solution of tri-n-butylamine in methylenechloride was stirred into the mixture. The viscosity measurements taken every month over a period of one-half year varied between 15,000 and 15,500 cs.

Example 3

Equivalent results were achieved when Example 1 was repeated employing the following silicon materials.
750 g. $HO[(CH_3)_2SiO]_xH$, 1,000 cs. and 250 g.

$$HO[(CH_3)(C_6H_5)SiO]_xH$$

1,000 cs. to produce a 50,000 cs. copolymer.
995 g. $HO[(CH_3)_2SiO]_xH$, 1,000 cs. and 5 g.

$$CH_2=CH(CH_3)_2SiOH$$

to produce a 100,000 cs. polymer.
500 g. $HO[(CH_3)_2SiO]_xH$, 500 cs. and 500 g.

$$HO[(CH_3)(CF_3CH_2CH_2)SiO]_xH$$

700 cs. to produce a copolymer of 15,000 cs.
The polymeric products prepared in the examples of U.S. Patent No. 2,990,419.

Example 4

Equivalent results were achieved when Examples 1, 2 and 3 were repeated employing the following tertiary amines in inert organic solvents forming 30% by weight amine in solution in amount ranging from 1 mol amine per mol of phosphoronitrile chloride to 1.5 mol amine per mol of phosphoronitrile chloride: diethyl-benzyl amine, diethyl-isoamyl amine, tri-isobutylamine, tri-sec.-isopropylamine, triethylamine, methyldiethylamine, triphenylamine, triisoamylamine and triethanolamine.

That which is claimed is:

1. In the preparation of essentially diorganosiloxane polymers employing phosphoronitrile chlorides as catalytic agents, the improvement comprising neutralizing said catalyst and stabilizing the polymer by adding thereto from 1 to 1.5 mols of a tertiary amine per mol of phosphoronitrile chloride present in the mass.

2. The method of preparing a stable siloxane fluid of desired viscosity comprising admixing at least one hydroxyl containing essentially diorganosiloxane polymer wherein the organic substituents are selected from the group consisting of monovalent hydrocarbon, halogenohydrocarbon and cyanoalkyl radicals with a phosphoronitrile chloride condensation catalyst and thereafter neutralizing the catalyst by adding to the reaction mass from 1 to 1.5 mols of a tertiary amine per mol of phosphoronitrile chloride present.

3. The method of claim 2 wherein the tertiary amine is of the formula $R'_3N$ where $R'$ is a monovalent hydrocarbon radical.

4. The method of claim 2 wherein the diorganosiloxane polymer employed is of the average general formula $$(HO)_z(R_nSiO_{\frac{4-n}{2}})_xH$$

where each R is selected from the group consisting of monovalent hydrocarbon and substituted hydrocarbon radicals, $z$ has an average value from 0.95–1.05, $n$ has an average value from 1.95 to 2.05, the sum of $n+z$ is 3 and $x$ is at least 1.

5. The method of claim 4 where R is methyl.

6. The method of claim 4 where R is methyl and phenyl.

7. The method of claim 4 where R is methyl and vinyl.

8. The method of claim 4 where R is methyl, vinyl, and phenyl.

9. A method for preparing siloxane fluids comprising (A) admixing an organosiloxanol wherein the organic substituents are monovalent hydrocarbon radicals with a phosphoronitrile chloride in a common inert organic solvent, at room temperature and when the desired viscosity of the product has been attained, (B) neutralizing the phosphoronitrile chloride by adding a tertiary amine in amount of from 1 to 1.5 mols of amine per mol of phosphoronitrile chloride in the mass.

References Cited
UNITED STATES PATENTS

| | | | |
|---|---|---|---|
| 3,094,497 | 6/1963 | Hyde | 260—18 XR |
| 3,186,967 | 6/1965 | Nitzsche, et al. | 260—46.5 |
| 3,280,071 | 10/1966 | Beck | 260—46.5 |
| 3,296,198 | 1/1967 | Lukes | 260—46.5 |
| 3,308,203 | 3/1967 | Metevia, et al. | 260—825 XR |

TOBIAS E. LEVOW, *Primary Examiner.*

J. P. PODGORSKI, *Assistant Examiner.*